United States Patent
Iurisci et al.

(10) Patent No.: US 12,322,998 B2
(45) Date of Patent: Jun. 3, 2025

(54) COOLING OF ACTIVE ELEMENTS OF ELECTRICAL MACHINES

(71) Applicant: General Electric Renovables Espana, S.L., Barcelona (ES)

(72) Inventors: Giuseppe Iurisci, Barcelona (ES); Shanmuga-Priyan Subramanian, Hamburg (DE)

(73) Assignee: General Electric Renovables Espana, S.L., Barcelona (ES)

( * ) Notice: Subject to any disclaimer, the term of this patent is extended or adjusted under 35 U.S.C. 154(b) by 197 days.

(21) Appl. No.: 17/868,155

(22) Filed: Jul. 19, 2022

(65) Prior Publication Data
US 2023/0023771 A1    Jan. 26, 2023

(30) Foreign Application Priority Data
Jul. 26, 2021    (EP) ..................................... 21382691

(51) Int. Cl.
| | |
|---|---|
| *H02K 9/02* | (2006.01) |
| *H02K 1/12* | (2006.01) |
| *H02K 1/22* | (2006.01) |
| *H02K 7/18* | (2006.01) |

(52) U.S. Cl.
CPC ................. *H02K 1/12* (2013.01); *H02K 1/22* (2013.01); *H02K 7/183* (2013.01)

(58) Field of Classification Search
CPC .. H02K 1/12; H02K 7/00; H02K 7/18; H02K 7/183; H02K 7/1838; H02K 9/00; H02K 9/02; F03D 80/60; F03D 9/25
See application file for complete search history.

(56) References Cited

U.S. PATENT DOCUMENTS

| | | | |
|---|---|---|---|
| 10,819,170 B2 | 10/2020 | Messner et al. | |
| 11,289,976 B2 | 3/2022 | Ramtahal et al. | |
| 2011/0241353 A1* | 10/2011 | Numajiri | F03D 9/25 290/1 B |

(Continued)

FOREIGN PATENT DOCUMENTS

| | | | |
|---|---|---|---|
| EP | 1837519 A2 * | 9/2007 | |
| EP | 2757666 A1 | 7/2014 | |
| EP | 3508720 B1 | 6/2020 | |

(Continued)

OTHER PUBLICATIONS

European Search Report Corresponding to EP21382691 on Jan. 21, 2022.

*Primary Examiner* — Tran N Nguyen
(74) *Attorney, Agent, or Firm* — Dority & Manning, P.A.

(57) ABSTRACT

The present disclosure relates to electrical machines and methods for cooling active elements of electrical machines. More in particular, the present disclosure relates to rotors of electrical machines. An electrical machine may for example be a generator for a direct drive wind turbine. An electrical machine comprises a rotor comprising a plurality of active rotor elements, a stator comprising a plurality of active stator elements, and an air gap separating the active rotor elements and the active stator elements. The rotor further comprises one or more rotor openings configured for letting air flow enter the electrical machine and cool the active rotor elements and/or active stator elements in response to a rotation of the rotor.

13 Claims, 5 Drawing Sheets

(56) References Cited

U.S. PATENT DOCUMENTS

2020/0132055 A1    4/2020  Michaelsen
2021/0036579 A1*  2/2021  Ramtahal ................ H02K 9/02

FOREIGN PATENT DOCUMENTS

| EP | 3772160 A1 | | 2/2021 | |
|----|------------|---|--------|---|
| JP | 2006271081 A | * | 10/2006 | ............... H02K 9/00 |
| WO | WO2018197058 A1 | | 11/2018 | |

* cited by examiner

COOLING OF ACTIVE ELEMENTS OF ELECTRICAL MACHINES

TECHNICAL FIELD

The present disclosure relates to electrical machines and methods for cooling active elements of electrical machines. More in particular, the present disclosure relates to rotors of electrical machines. An electrical machine may for example be a generator for a direct drive wind turbine.

BACKGROUND

Electrical machines, such as motors and generators, generally comprise a rotor structure and a stator structure. Large electrical generators may be e.g. electrically excited generators or permanent magnet excited generators (PMG). The rotor of an electrical machine rotates with respect to the stator. The rotor may be the inner structure and the stator the outer structure. The stator in this case thus surrounds, e.g. radially, the rotor. Alternatively, the configuration may be the opposite, i.e. the rotor surrounds, e.g. radially, the stator.

Such generators may be used for example in wind turbines. Wind turbines generally comprise a rotor with a rotor hub and a plurality of blades. The rotor is set into rotation under the influence of the wind on the blades. The rotation of the rotor shaft either drives the generator rotor directly ("directly driven") or through the use of a gearbox.

A direct drive wind turbine generator may have e.g. a diameter of 6-10 meters (236-328 inches), a length of e.g. 2-3 meters (79-118 inches) and may rotate at low speed, for example in the range of 2 to 20 rpm (revolutions per minute). Alternatively, generators may also be coupled to a gearbox which increases the rotational speed of the generator to for example between 50 to 500 rpm or even more.

In electrical machines, such as generators of direct drive wind turbines, cooling is generally important. In particular, the active elements of the rotor and the stator, e.g. permanent magnets and coils, may heat up. An increase in temperature of the active rotor and stator elements may lead to failure of the active elements and may reduce the efficiency of the generator. To reduce the temperature of the active elements of the rotor and the stator, heat may be removed from the active elements by providing cooling through the air gap separating the active elements. A cooling system may be provided for reducing the temperature of the active elements of the rotor and the stator.

Such a cooling system may comprise a primary loop. A primary loop may include a primary fluid inlet. A primary fluid, for example air, may be carried from the primary fluid inlet to the active rotor and stator elements. For example, air may be directed to an air gap between the active rotor and stator elements. As the active elements heat up, the fluid is heated up too. The heated primary fluid may be carried away to a primary fluid outlet. In some examples, the primary fluid outlet and inlet may fluidly communicate with an exterior of the wind turbine, e.g. the air surrounding the nacelle. For example, the cooling system may comprise fans, e.g. in the nacelle, for introducing air from a wind turbine outside through the primary fluid inlet. Conduits may carry the primary loop fluid from the primary fluid inlet to the generator air gap, and then conduits may carry the heated primary loop fluid from the generator air gap to the primary fluid outlet.

In other examples, the primary fluid inlet and outlet may fluidly communicate with a heat exchanger. A secondary loop for the fluid may include a heat exchanger. A heat exchanger may comprise a heat exchanger inlet and a heat exchanger outlet. A secondary fluid may be introduced to the heat exchanger through the heat exchanger inlet, and once the secondary fluid has cooled the primary fluid heated in the generator air gap, the primary fluid may be removed from the heat exchanger through the heat exchanger outlet. The secondary fluid may for example be water or air. Conduits may be used to guide the heated primary fluid inside the heat exchanger and then, once cooled down, out of it. The cooled primary fluid may be then directed again towards the air gap between the active elements of the rotor and the generator.

SUMMARY

In an aspect of the present disclosure, an electrical machine is provided. The electrical machine comprises a rotor a rotor comprising a plurality of active rotor elements, a stator comprising a plurality of active stator elements, and an air gap separating the active rotor elements and the active stator elements. The rotor further comprises one or more rotor openings configured for letting ambient air flow enter the electrical machine and cool the active rotor elements and/or active stator elements in response to a rotation of the rotor.

According to this aspect, air may be sucked through the one or more rotor openings when rotating the rotor. Once inside the electrical machine, the air may pass through an air gap separating the active elements of the rotor and the stator, e.g. in a radial or an axial direction, and may heat up. The heated air may be caused to exit the generator, therefore cooling the active rotor and stator elements. Forced convection may cool the active parts of the rotor and the stator, and a cooling system with pipes and fans for introducing air into the electrical machine may be dispensed with.

Active elements, as used throughout the present disclosure, may be regarded as elements of the rotor or stator that are magnetically and/or electrically active.

An electrical machine may be a generator, in particular a generator for a wind turbine, and more in particular a generator for a direct drive wind turbine.

In a further aspect, a method for cooling an electrical machine is provided. The electrical machine comprises rotor, a stator and an air gap separating the rotor and the stator. The method comprises rotating the rotor to cause a cooling air flow from an outside of the electrical machine to enter an inside of the electrical machine through one or more openings in the rotor.

In yet a further aspect, a generator for a direct drive wind turbine is provided. The generator comprises a rotor comprising a plurality of active rotor parts, a stator comprising a plurality of active stator parts, and an air gap separating the active parts of the rotor and the active parts of the stator. The rotor comprises one or more openings configured to create a difference of pressure between an inside and an outside of the generator as a result of rotating the rotor, the pressure being lower in an inside of the generator than in an outside of the generator.

DETAILED DESCRIPTION OF EXAMPLES

Figure 1:
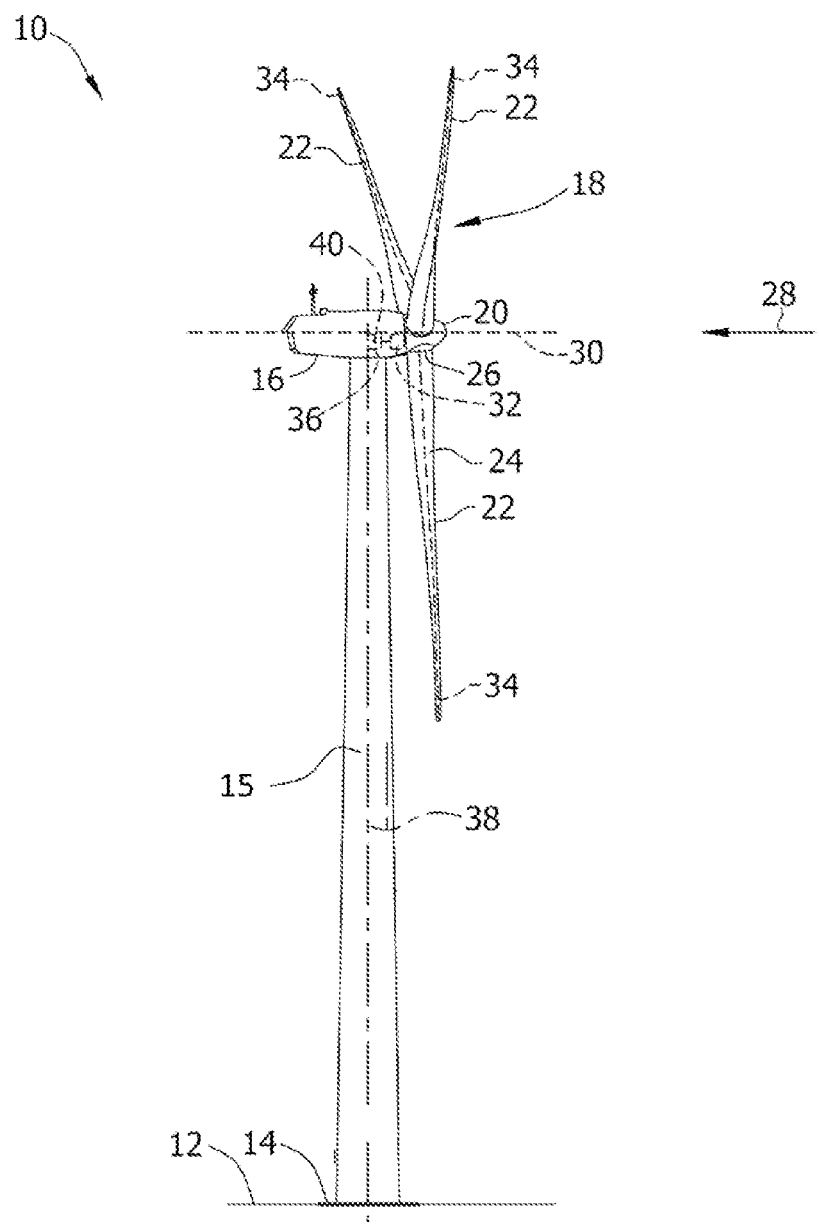
FIG. 1 schematically illustrates a perspective view of one example of a wind turbine.

Reference now will be made in detail to embodiments of the disclosure, one or more examples of which are illustrated in the drawings. Each example is provided by way of explanation of the disclosure, not as a limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Although a generator for a direct drive wind turbine is referred to herein, the disclosure can be applied in general to electrical machines.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower. A wind turbine 10 may be placed both onshore and offshore.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
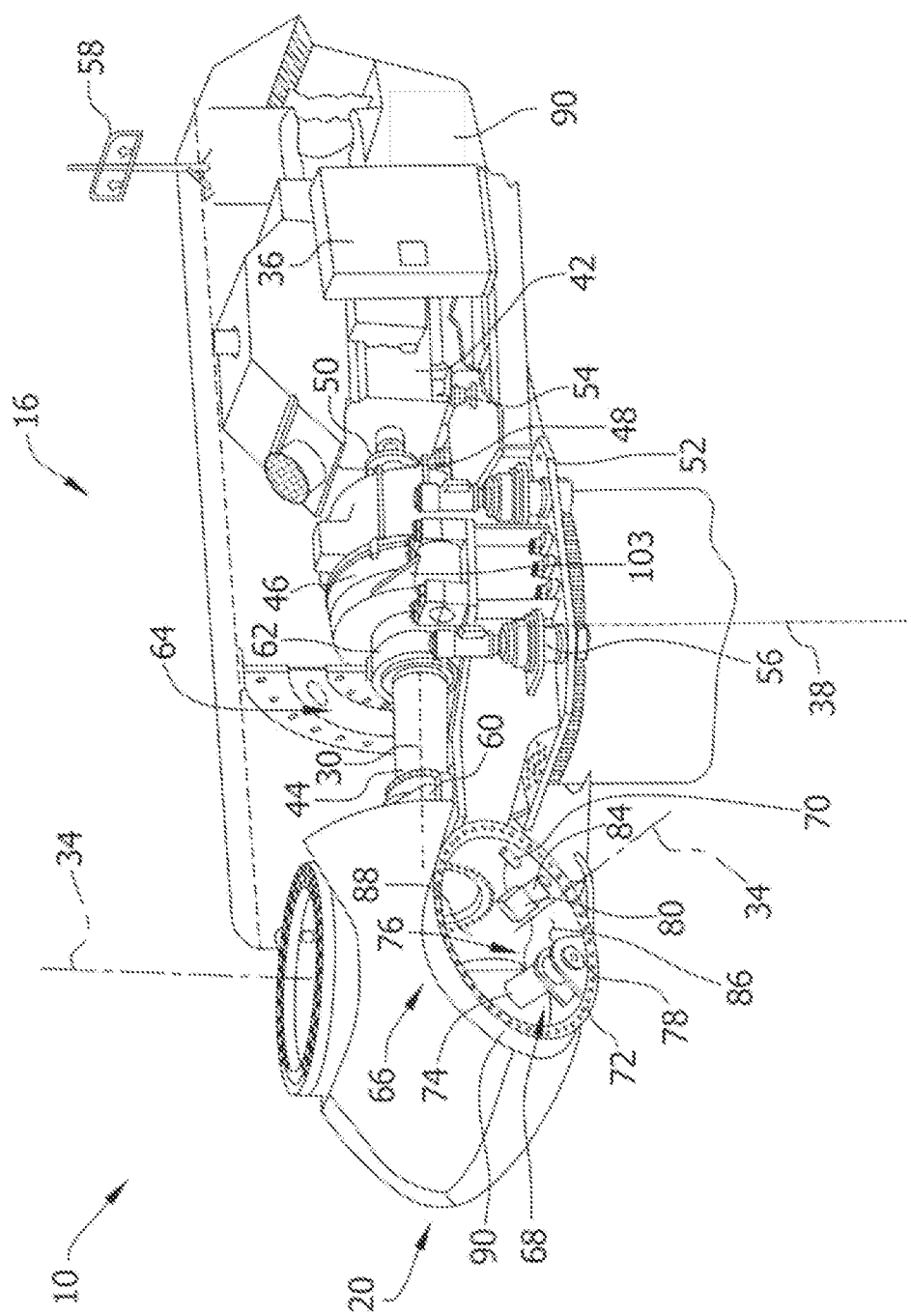
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

In an aspect of the disclosure, an electrical machine 100 is provided. The electrical machine 100 comprises a rotor 110 and a stator 120. The rotor 110 comprises a plurality of active rotor elements 112, and the stator 120 comprises a plurality of active stator elements 122. An air gap 115 separates the active rotor elements 112 and the active stator elements 122. The rotor further comprises one or more rotor openings 150 configured for letting ambient air flow enter the electrical machine and cool the active rotor elements and/or active stator elements in response to a rotation of the rotor.

The air entering the electrical machine may cool the rotor and stator active elements without the need to provide guiding conduits for the air, fans and/or a heat exchanger. The rotation of the rotor 110 may be sufficient to cause the ambient air to enter the electrical machine 100 and cool the active elements 112, 122.

Figure 3:
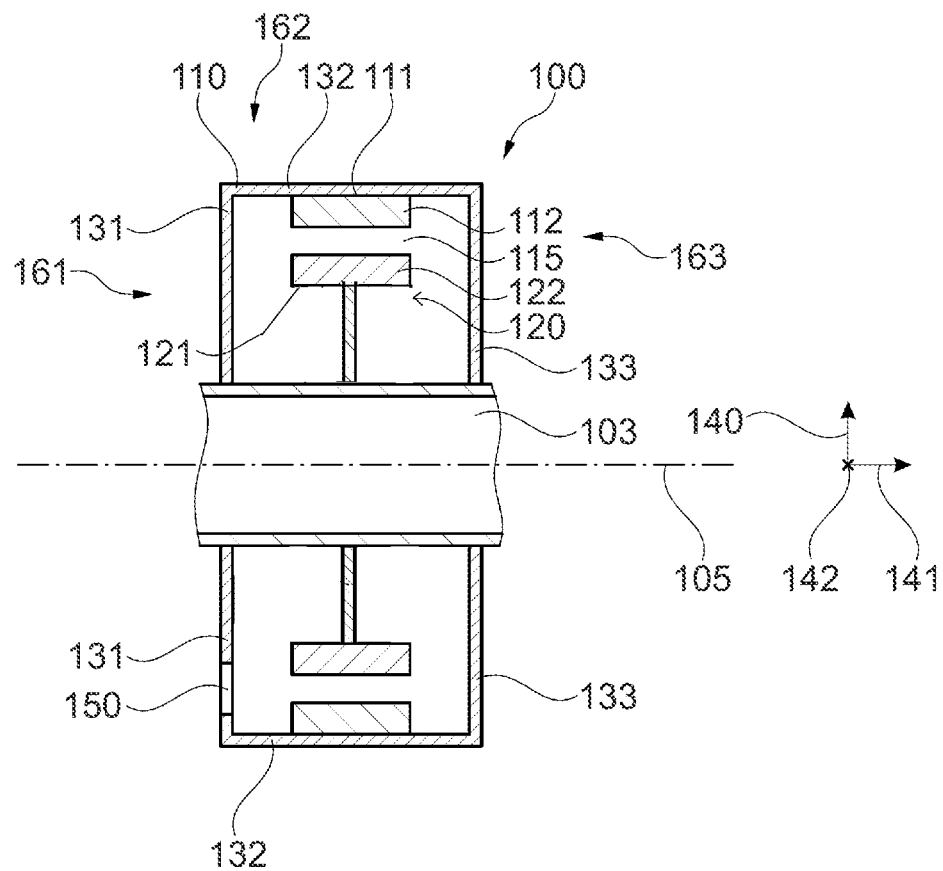
FIG. 3 schematically illustrates a cross-sectional view of an example of an electrical machine. The electrical machine may be a generator for a direct drive wind turbine.

FIG. 3 schematically illustrates a cross-sectional view of an example of an electrical machine 100. An electrical machine 100 comprises a rotor 110, a stator 120 and an air gap 115 between the rotor 110 and the stator 120. The rotor 110 is configured to rotate about an axis of rotation 105. In this example, the air gap 115 is a radial air gap and the electrical machine is a radial generator for a direct drive wind turbine, but in other examples the electrical machine 100 may be an axial electrical machine with an axial air gap.

In FIG. 3, the rotor 110 surrounds the stator 120. In other examples, the stator may surround the rotor.

The stator 120 comprises a stator rim 121 and a plurality of active stator elements 122. The rotor 110 comprises a rotor rim 111 and a plurality of active rotor elements 112. An active stator element 122 may be one or more permanent magnets, one or more permanent magnet modules, one or more coils, or one or more coil modules. An active rotor element 112 may likewise be one or more permanent magnets, one or more permanent magnet modules, one or more coils, or one or more coil modules. For example, an active stator element 122 may be a coil, and an active rotor element 112 may be a permanent magnet module. In other examples, both the active stator elements 122 and the active rotor elements 112 may be coils. An air gap 115 separates the active elements 112 of the rotor from the active elements 122 of the stator.

Multiple permanent magnets may be provided in a permanent magnet module, which may be attached to the rotor 110 as a single item. A permanent magnet module may be defined as a unit having a plurality of permanent magnets, such that the plurality of magnets can be mounted and unmounted together. Such a module may have a module base with a shape suitable for housing or carrying a plurality of permanent magnets that may be fixed to the base. The base may be configured to be fixed to a rotor structure such as a rotor rim 111 in such a way that the plurality of magnets is fixed together to the rotor rim 111 through the module base. The use of permanent magnet modules may facilitate the manufacturing of a rotor 110. Similarly, stator coils may be grouped together in coil modules. Coil modules may be fixed to a generator structure such as a stator rim 121.

The rotor 110 may comprise a drive side 161, a central side 162 and a non-drive side 163. The drive side 161 may also be referred to as front side 161 and may be configured to face a wind turbine hub 20. In the drive side 161, the rotor may comprise a drive side cover 131 which may mainly extend in a radial 140 and in a tangential or circumferential direction 142. A drive side cover 131 may protect the active elements of the rotor and the stator from moisture and undesirable particles in the wind such as dust in an axial direction 141. In the central side 162, the rotor may comprise a central side cover 132 which may include the rotor rim 111, and may mainly extend in a circumferential direction 142 and in an axial direction 141. The rotor may further comprise a non-drive side cover 133 in the non-drive side 163. The non-drive side 163 may be also referred to as back side 163. The central side cover 132 may extend between the front side cover 131 and the back side cover 133 of the rotor 110.

The stator 120 may be fixedly mounted on a generator support 103. The rotor 110 may be rotatably mounted on the generator support 103 and may be connected to a hub 20 of a wind turbine 10. The first side 131 of the rotor 131 may be joined to the generator support 103 by a bearing (not shown). If the rotor 110 comprises a non-drive side cover 133 which extends up to the generator support 103, a bearing may also be used to join the non-drive side cover 133 to the support 103. The generator support 103 may be a wind turbine frame, for example a front portion of a direct drive wind turbine frame.

An opening 150 may be provided at any of the front 131, central 132 and back 133 cover sides of the rotor 110. For example, one or more rotor openings 150 may be provided at a drive side cover 131 of the rotor 110. An example of this option has been schematically illustrated in FIG. 4A. As the driven side cover 131 may be configured to be upstream, if one or more front openings 150 are provided, an ambient air flow may naturally enter the generator 100. The rotation of the rotor 110 may help to circulate the air flow through the generator 100, and in particular through the air gap 115 between the active elements of the rotor and the stator. The rotation of the rotor 110 causes a decrease in pressure inside the rotor to suck ambient air into the rotor. The air, e.g. the air heated after being in contact with the active elements 112, 122, may be exhausted through the back of the rotor 110. If the rotor includes a back side cover 133, the air may leave the generator 100 through one or more outlets 153 in the back side cover 133. In other examples, the non-drive side 133 cover does not extend radially inwards to the generator support (as e.g. in FIGS. 4B and 4C), and the air may leave the generator through a space 136 between the back side 133 cover and a generator support 103.

Figure 4A:
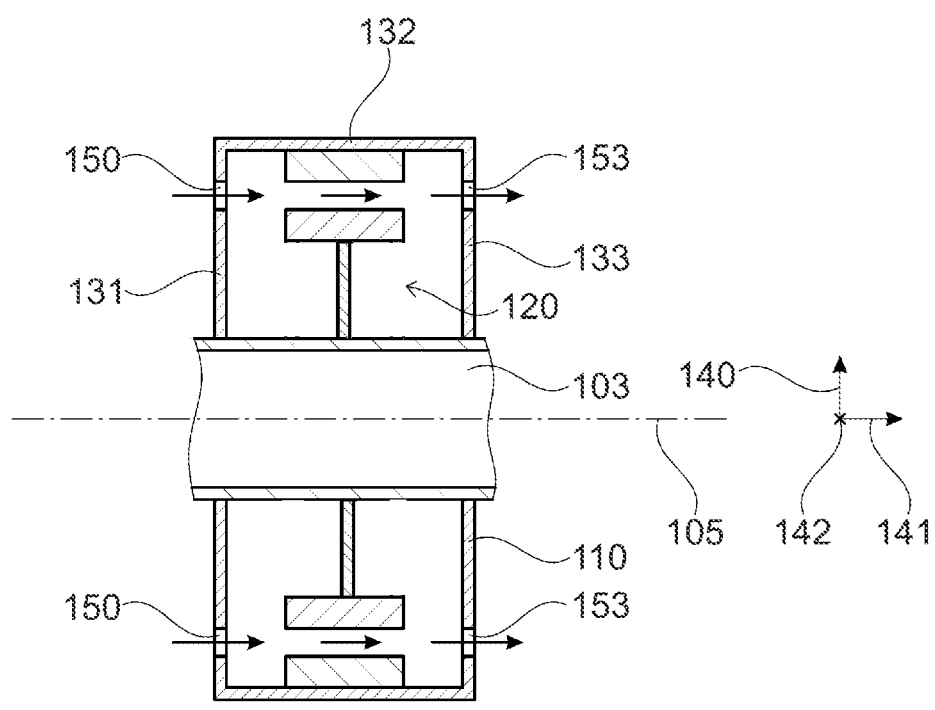
FIGS. 4A-4C schematically illustrate cross-sections of different examples of an electrical machine.
Figure 4B:
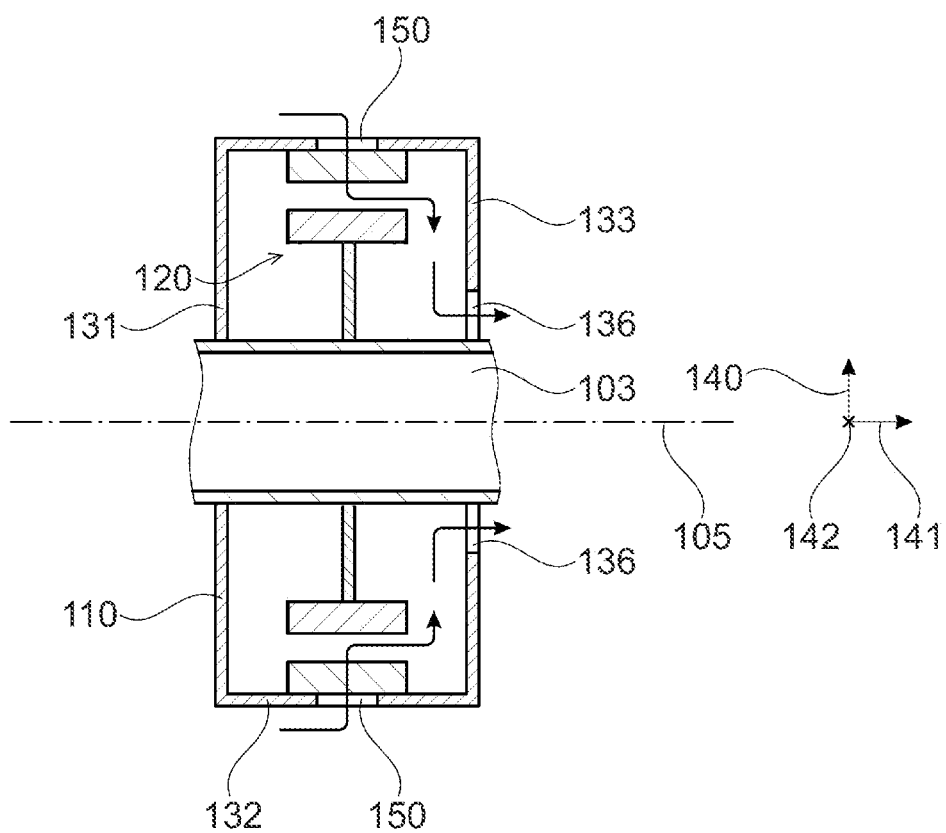

In some other examples, as e.g. in FIG. 4B, one or more rotor openings 150 may be provided at a central side cover 132 of the rotor 110. In these examples, the rotational speed of the rotor 110 may cause that ambient air flowing close, e.g. relatively parallel, to the central side cover 132 enters the generator 100 from an outside of the electrical machine to an inside of the electrical machine. In the electrical machine 100 of FIG. 3, the air entering through central opening(s) 150 may flow between the active elements 112 of the rotor 110 towards the air gap 115. The heated air may exhaust through a back of the rotor 110 as described above. An opening 150 in a central side 132 may fully extend from the drive side cover 131 to the non-drive side cover 133 of the rotor 110.

Figure 4C:
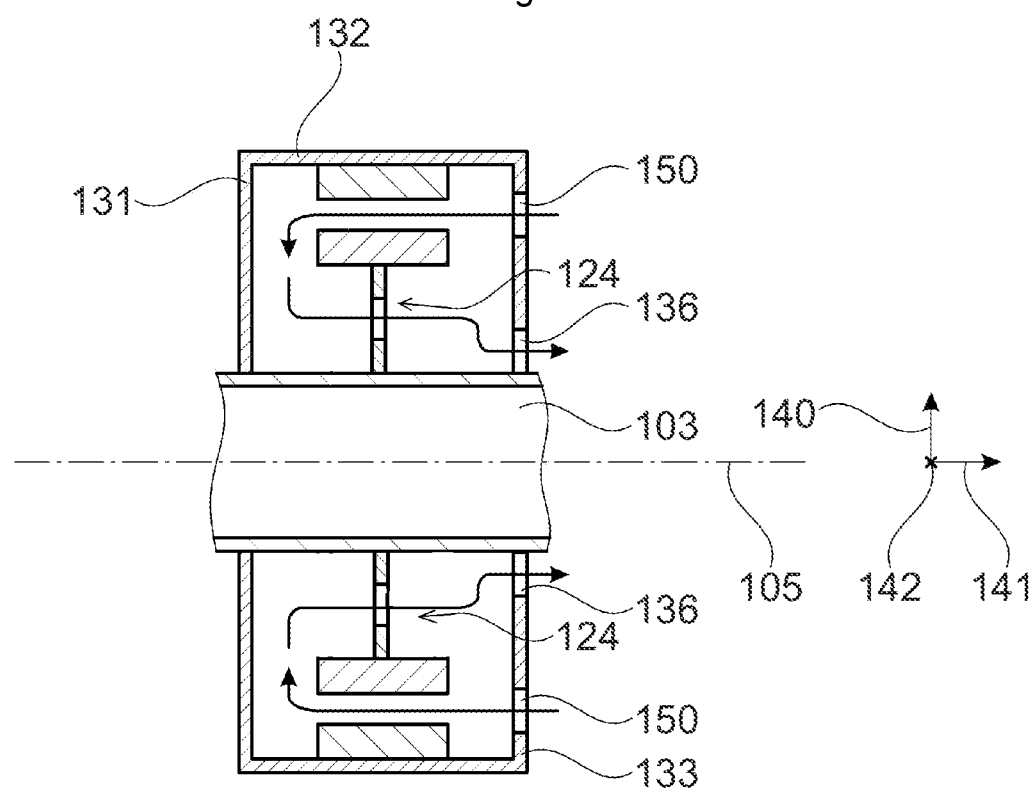

Still in other examples, as e.g. in FIG. 4C, one or more openings 150 may be provided at a back side cover 133 of the rotor 110. The rotation of the rotor 110 may cause ambient air close to the back side cover 133 to be sucked into the generator 100 and flow across the air gap 115, decreasing the temperature of the active rotor and stator elements. One possible way to exhaust the air in the air gap 115 may be to circulate the heated air close to the front side cover 131 of the rotor to the back of the rotor through the stator 120, as indicated in FIG. 4C. The stator 120, e.g. a stator frame, may have inlet(s) and outlet(s) to this end. In the example of FIG. 4C, a window 124 is provided which allows transmission of cooling flow through the stator. Inlet(s) may be provided in a first or front side cover of the stator (if present), and outlet(s) may be provided in a second or back side cover of the stator (if present). After the heated air crosses the stator 120, the air may be exhausted through one or more outlets 153 in the back side cover 133 of the rotor 110 or through a space 136 between the rotor 110 and the generator support 103.

In the above examples, the rotor 110 surrounds the stator 120, in particular radially. Having the rotor 110 around the stator 120 may facilitate causing ambient air to enter the generator 100 and to flow through the air gap 115 for cooling the active elements of the rotor and the stator. The stator 120 may surround the rotor 110 in other examples.

In FIGS. 4A-4C, rotor openings 150 have been shown in one side cover of the rotor 110 only. However, openings 150 may be provided at more than one side cover of the rotor 110. For example, one or more openings 150 may be provided at a central side cover 132 of the rotor, and one or more openings may be provided at a back side cover 133 of the rotor. Similarly, one or more openings 150 may be provided at a non-drive side cover 131 of the rotor, and one or more openings may be provided at a non-drive side cover 133 of the rotor. One or more openings at the drive side cover 131 may be aligned with one or more openings at the non-drive side cover 133 in an axial direction 141. In general, the location of the openings 150 may be adapted for creating a suitable route for the air flow along and/or through the electrical machine 100.

Figure 5:
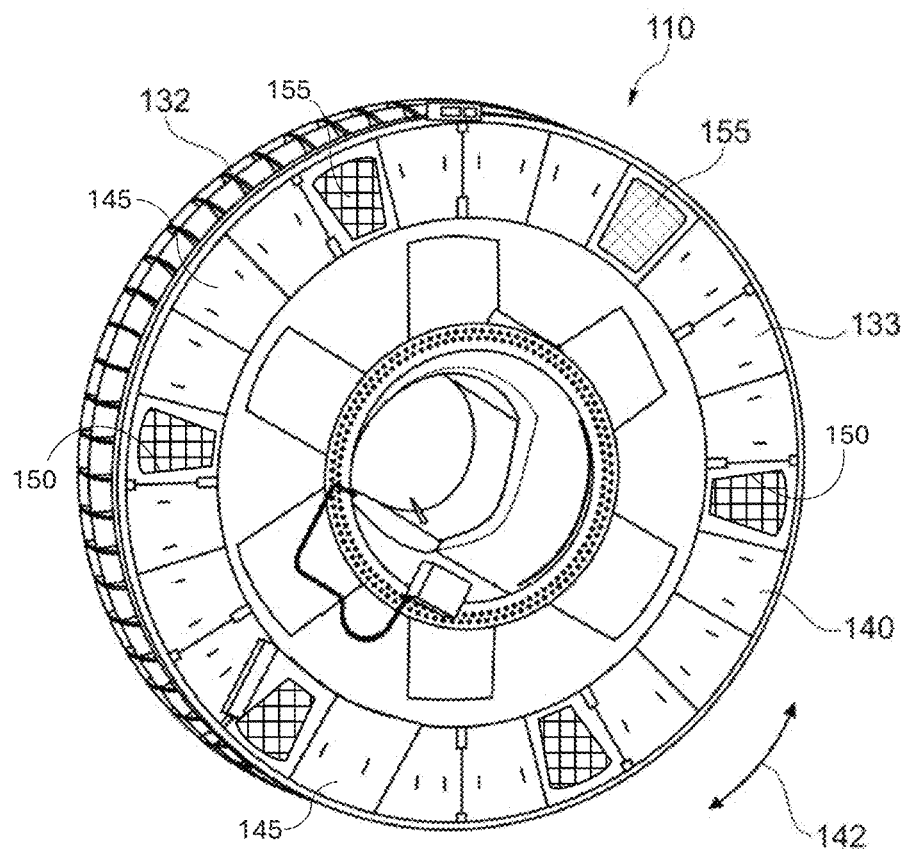
FIG. 5 schematically illustrates a perspective back view of a generator for a direct drive wind turbine.

Rotor openings 150 may be distributed along a circumferential direction 142. FIG. 5 shows a perspective view of a rotor 110 from the back. In this figure, the rotor 110 has a back side cover 133. The back side cover 133 is an annular cover 140 that comprises a plurality of segments 145. Thus, when mounted to a generator support 103, the back side cover 133 will not be joined to the support 103. An annular cover 140 may be attached to a flange of a central side cover 132 of the rotor in some examples.

Six segments 145 have been removed from the annular cover 140 in FIG. 5. When the rotor 110 is rotated around axis 105, the pressure may drop inside the rotor 110 and ambient air may be introduced into the generator 100 and decrease the temperature of active rotor and stator elements. Providing a plurality of air inlets along a circumferential direction 142 may increase an amount of air which contacts the active elements 112, 122. Cooling may therefore be enhanced.

A rotor opening 150 has a certain area. The sum of the areas of the openings 150 at the rotor may be referred to as combined area. In some examples, the combined area of the rotor openings 150 may represent between 10% and 40% of the total surface of the rotor side covers, more in particular between 10% and 25%. For example, if openings 150 are only provided in a side cover 131, 132, 133 of the rotor, the openings 150 may occupy between the 10% and 25% of the total (external) surface of the rotor covers. In some examples, the surface occupied by the openings may be about 15% of the total (external) surface of the rotor. In other examples, where openings 150 are provided at more than one side cover of the rotor, the combined area of the openings may about 15% of the total (external) surface of the rotor. Sufficient structural integrity of the rotor 110 and sufficient cooling of the active elements 112, 122 may be provided in this range.

In some examples, a rotor opening 150 may have an area up to 2 m² (squared meters). In some of these examples, a rotor opening 150 may have an area between 0.3 m² and 1.5 m². For example, a rotor opening 150 may have an area about 1.1 m². All the rotor openings 150, regardless of their location at the rotor side covers, may have a substantially same area.

In some examples, a rotor 110 may comprise two or more openings 150. For example, a rotor 110 may comprise between two and ten openings 150, and more in particular between four and eight openings. Six rotor openings 150, as e.g. illustrated in FIG. 5, may be provided.

Rotor openings 150 may be provided such that they face the air gap 115. For example, in FIGS. 4A and 4C, the rotor openings 150 face or are substantially aligned with the air gap 115 in an axial direction 141. In FIG. 4B, the rotor openings 150 face or are substantially aligned with the air gap 115 in a radial direction 140. This may help to direct the air flow towards the air gap 115.

The electrical machine 100 may further comprise one or more air filters 155 arranged in one or more of the rotor openings 150. FIG. 5 shows a filter 155 in an opening. A filter 155 filling or covering an opening 150 may prevent or reduce the entry possible damaging agents, e.g. dust, moisture, salt, from an outside of the generator 100. The life service of the electrical machine 100 may therefore be extended. In some examples, a filter 155 is arranged with, e.g. in, each rotor opening 150. The rotation of the rotor 110, e.g. the rotor of a direct drive wind turbine 10, may be sufficient for creating a pressure inside the rotor 110 lower enough for overcoming a pressure drop of the filter(s) 155 and sucking ambient air into the rotor.

Different types of filters 155 may be used. A filter 155 may comprise one or more filtering regions. In some examples, a first filtering region may comprise a vane separator and a second region may comprise one or more filtering elements. The one or more filtering elements may be configured to filter air more finely than the vane separator. Additionally, subsequent filtering regions may be optionally present. Therefore, air entering the rotor 110 may be first filtered in the first filtering region, and then more finely filtered in the second filtering region; and if there are more filtering regions, also in the subsequent filtering regions. The filter 155 may be placed such that a first filtering region, e.g. comprising a vane separator, is facing an outside of the rotor 110.

In some examples, the electrical machine 100 may further comprise one or more fans at one or more rotor outlets 153, 136. Fans may be used for supporting cooling. For example, if the wind speed is not enough for satisfactorily cooling the active elements of the rotor and the stator, fans may be switched on for generating low pressure regions and forcing air to flow from an air gap 115 to the rotor outlets 153, 136.

Figure 6:
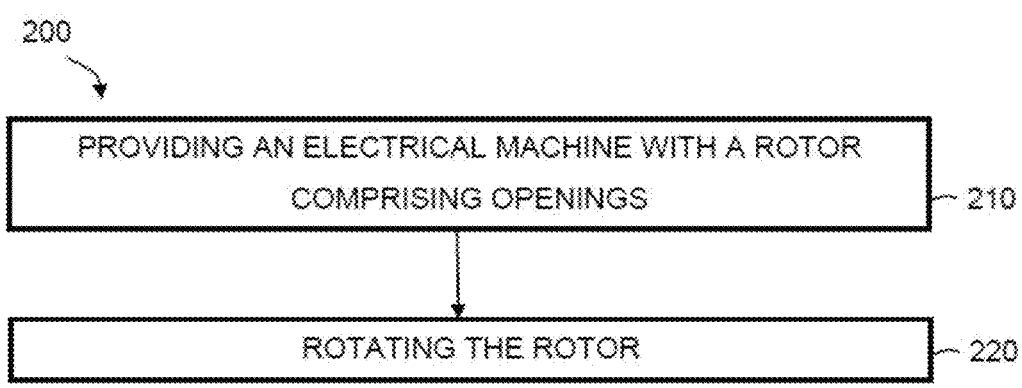
FIG. 6 schematically illustrates a flowchart of an example of a method for cooling active rotor and stator elements.

In an aspect of the disclosure, a method 200 is provided. Method 200 is suitable for cooling active rotor elements 112 and active stator elements 122 of an electrical machine 100. Method 200 is schematically illustrated in FIG. 6.

In some examples, the electrical machine may be a generator, in particular a generator for a wind turbine, and more in particular a generator for a direct drive wind turbine.

For a direct drive wind turbine having a nominal power of 10 MW or more, a cooling flow of more than 15 m³/s, and specifically more than 20 m³/s, and more specifically 25 m³/s of volumetric flow rate may be provided. In order to provide such a volumetric cooling flow rate, inlets with a combined surface area (including air filers) of more than 5 m², specifically more than 6 m², and more specifically 6.5 m² or more may be provided.

The method comprises, at block 210, providing an electrical machine 100 comprising a rotor 110, a stator 122, and an air gap 115 separating the rotor and the stator.

The rotor openings 150 may be positioned as explained above, e.g. with respect to FIGS. 4A-4C. One or more openings 150 may be provided in a drive side cover 131 of the rotor, and/or one or more openings 150 may be provided in a central side cover 132 of the rotor, and/or one or more openings may be provided in a non-drive side cover 133 of the rotor. One or more filters 155 may be arranged with one or more rotor openings 150, e.g. inside the openings. The rotor openings may be completely covered or filled by the filters 155.

The rotor 110 may surround the stator 120, e.g. radially 140. The cooling may be enhanced if the electrical machine 100 has this configuration.

The method further comprises, at block 220, rotating the rotor 110 to cause a cooling air flow from an outside of the electrical machine 100 to an inside of the electrical machine through one or more openings 150 in the rotor 110. By rotating the rotor 110, ambient air may be caused to enter the electrical machine 100 through the openings 150 and flow through an air gap 115, thereby cooling active parts of the rotor and active parts of the stator.

The rotor 110 may be rotated by the action of the wind on one or more wind turbine blades 22.

Several factors may affect the ability of sucking air into the electrical machine 100, and thus the cooling of the air gap 115. Some factors may be the power of the electrical machine, the rotational speed of the rotor 110 and the diameter of the rotor. Depending on the power of the machine and a rotor size, a number, size and position of rotor openings 150 may be selected for suitably cooling an air gap 115. The speed of rotation of a rotor of a direct drive wind turbine, e.g. between 2 to 14 rpm (revolutions per minute) may be sufficient for suitably cooling an air gap 115.

Still in another aspect of the disclosure, a generator 100 for a direct drive wind turbine 10 is provided. The generator 100 comprises a rotor 110 and a stator 120. The rotor 110 comprises a plurality of active rotor parts 112 and the stator 120 comprises a plurality of active stator parts 122. An air gap 115 separates the active parts of the rotor and the active parts of the stator.

The rotor 110 comprises one or more openings 150 configured to create a difference of pressure between an inside and an outside of the generator 100 as a result of rotating the rotor 110. The pressure is lower in an inside of the generator 100 than in an outside of the generator.

One or more rotor openings 150 are provided at least in one of: a front side cover of the rotor, a central side cover of the rotor, and a back side cover of the rotor.

A rotor 110 may comprise two or more openings 150. For example, a rotor 110 may comprise between two and ten openings 150, and more in particular between four and eight openings. Six rotor openings 150 may be provided in some examples.

A rotor opening 150 may have an area up to 2 m$^2$ (squared meters). In some of these examples, a rotor opening 150 may have an area between 0.3 m$^2$ and 1.5 m$^2$. For example, a rotor opening 150 may have an area about 1.1 m$^2$. All the rotor openings 150, regardless of their location at the rotor side covers, may have a substantially same area.

The rotor openings 150 may extend over between the 10% and 40% of the total (external) surface of the rotor side covers, and more in particular between the 10% and 25% of the total (external) surface of the rotor side covers. In some examples, the surface covered by the openings may be about 15% of the total (external) surface of the rotor. One or more filters 155 may be arranged with one or more openings 150, e.g. all the openings. A filter 155 may completely fill or cover an opening 150.

The rotor 110 may surround, e.g. radially 130, the stator 120.

The description with regards to FIGS. 3-5 may be applied to the generator 100 of this aspect. In any of the disclosed examples, vanes, deflectors or other flow guiding elements may be provided to direct the incoming air flow in an appropriate direction through the electrical machine. For example, flow guiding elements may be provided in the examples of FIGS. 4B and 4C to ensure that the ambient air can reach different parts of the electrical machine, in a circumferential direction and/or in an axial direction to provide adequate cooling in the electrical machine. The flow guiding elements may be provided with a selection of the openings. The flow guiding elements may be the same for all the openings, or they may be different for the plurality of openings.

This written description uses examples to disclose the teaching, including the preferred embodiments, and also to enable any person skilled in the art to practice the herein disclosed teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. An electrical machine, comprising:
a rotor comprising a plurality of magnetically and/or electrically active rotor elements, a stator comprising a plurality of magnetically and/or electrically active stator elements, and an air gap separating the active rotor elements and the active stator elements;
the rotor rotatable relative to a rotation axis;
the rotor further comprising a rotor cover comprising a drive side cover, a central side cover, and a non-drive side cover; and
one or more rotor openings defined in one or a combination of the drive side cover, the central side cover, and the non-drive side cover, the one or more rotor openings axially aligned with the air gap or radially outward of the air gap in a direction away from the rotation axis such that ambient air flow is drawn into the rotor cover through the one or more rotor openings and then directly through the air gap to cool the active rotor or active stator elements in the air gap as a result of rotation of the rotor, wherein rotation of the rotor is configured to drive air flow to exit axially through the one or more rotor openings in the non-drive side cover.

2. The electrical machine of claim 1, further comprising an air filters arranged in the one or more rotor openings.

3. The electrical machine of claim 1, wherein a combined area of the one or more rotor openings is between 10% and 40% of a total surface area of the rotor cover.

4. The electrical machine of claim 3, wherein each of the one or more rotor openings has an area between 0.3 m$^2$ and 1.5 m$^2$.

5. The electrical machine of claim 1, wherein the rotor comprises between two and ten of the rotor openings.

6. The electrical machine of claim 1, comprising a plurality of the rotor openings distributed along a circumferential direction of the rotor.

7. The electrical machine of claim 1, further comprising a fan at the one or more rotor openings.

8. The electrical machine of claim 1, wherein the rotor surrounds the stator.

9. The electrical machine of claim 1, wherein the electrical machine is a generator for a direct drive wind turbine.

10. A direct drive wind turbine, comprising the electrical machine of claim 1 configured as a generator.

11. A method for cooling an electrical machine that includes a rotor, a stator, and an air gap separating the rotor and the stator, the method comprising:
rotating the rotor relative to a rotation axis to cause a cooling air flow from an outside of the electrical machine to enter an inside of the electrical machine through one or more openings in the rotor;
wherein the one or more openings are configured in a rotor cover axially aligned with the air gap or radially outward of the air gap in a direction away from the rotation axis so that the cooling air flow is drawn through the one or more openings and then directly through the air gap; and wherein rotation of the rotor is configured to drive the cooling air flow to exit axially through the one or more rotor openings in a non-drive side cover.

12. The method of claim 11, wherein the rotor is rotated by the action of wind acting on one or more wind turbine blades.

13. The method of 11, wherein the rotor surrounds the stator.

* * * * *